United States Patent [19]

Yoshida et al.

[11] Patent Number: 4,937,604
[45] Date of Patent: Jun. 26, 1990

[54] APPARATUS FOR REMOTELY CONTROLLING A CAMERA

[75] Inventors: Yoichi Yoshida; Keiji Kunishige, both of Tokyo, Japan

[73] Assignee: Olympus Optical Co., Ltd., Japan

[21] Appl. No.: 412,134

[22] Filed: Sep. 25, 1989

[30] Foreign Application Priority Data

Oct. 31, 1988 [JP] Japan .................... 63-275372

[51] Int. Cl.⁵ ............................ G03B 17/38
[52] U.S. Cl. .................... 354/266; 354/131; 354/267.1
[58] Field of Search ............ 354/266, 267.1, 131, 354/268, 289; 358/210; 340/825.72; 455/603

[56] References Cited

U.S. PATENT DOCUMENTS 3,961,342 6/1976 Maida .................... 354/131
4,864,340 9/1989 Kaneko .................. 354/266

FOREIGN PATENT DOCUMENTS 54-30047 3/1979 Japan .................... 354/266

Primary Examiner—L. T. Hix
Assistant Examiner—Cassandra C. Spyrou
Attorney, Agent, or Firm—Louis Weinstein

[57] ABSTRACT

A wireless remote control apparatus for a camera comprises a transmitter unit which is detachably mounted on the camera body and a receiver unit disposed in the camera. The wireless remote control apparatus determines if the remote control operation is possible prior to initiating a photographing operation of the camera.

51 Claims, 6 Drawing Sheets

APPARATUS FOR REMOTELY CONTROLLING A CAMERA

BACKGROUND OF THE INVENTION (a) Field of the Invention

The present invention relates to an apparatus for remotely controlling a camera, and in particular to a wireless remote control apparatus which is positively capable of remotely controlling a camera.

(b) Prior Art

Many wireless remote controls for remotely controlling a camera are known to the art. However, such controls are not popular among amateur photographers since they are expensive and/or large in size.

With the recent spread of wireless remote controls for indoor electric home appliances such as TV sets, VTRs, air conditioners, and the like, and of popular type cameras having a wireless detachable remote control into the marketplace, it is expected that amateur photographers will more often take picutures by using such wireless remote controls and that they will use such wireless remote controls like a self-timer. Therefore, a camera having a detachable wireless remote control which is easy to operate is in great demand.

However, wireless remote controls have a limited communication distance. More particularly, a wireless remote control using an infrared LED has a shorter effective communication or transmission distance. The effective transmittable distance depends on the ambient environment in which the wireless remote control is used. For example, a wireless remote control using an infrared light has a shorter effective transmission distance where the disturbance light is strong. The effective transmission distance also depends upon the angle of the wireless remote control with respect to a camera. An ultrasonic wave signal from a wireless remote control may not be detected in spite of the small separation distance between a camera and the wireless remote control if a transparent plate such as glass is interposed therebetween.

Since TV sets and VTRs are used indoors, that is, in a limited separation distance area and under a condition of rather stable disturbance light, the effective transmission distance does not present a problem and hence need not be considered. It is easy to determin if the function of an appartus is performed in fact by transmitting a signal from a wireless remote control even when there is a concern of difficulty of remote control due to excessive consumption of a power battery.

However, a camera is often used outdoors. The main function of the camera is to take a picture of an object to be photographed. Conducting a test transmission to check the function causes one frame of film to be washed and further causes an electronic flash to wastefully emit light thereby prematurely consuming the battery source and may cause the loss of a shutter chance while waiting for the electronic flash to recharge, if the camera is fully automatic.

SUMMARY OF THE INVENTION

It is an object of the present invention to provide a wireless remote control apparatus for a camera which overcomes the aforementioned problems of the prior art.

It is another object of the present invention to provide a wireless remote control apparatus for a camera, in which determination of whether an effective remote control is possible can be made prior to performing the photographing operation of a camera, so that the desired photographing is conducted by the remote control apparatus.

It is still another object of the present invention to provide a wireless remote control apparatus for a camera in which a remote control transmitter is enabled by the remote control receiver which enables a remote control operation only when there is an effective transmission capability between transmitter and receiver.

BRIEF DESCRIPTION OF THE DRAWINGS

The above and other objects and advantages of the present invention will be described in detail with reference to the drawings: in which.

DETAILED DESCRIPTION OF PREFERRED EMBODIMENTS

An embodiment of the present invention will be described with references to the drawings.

Figure 1:
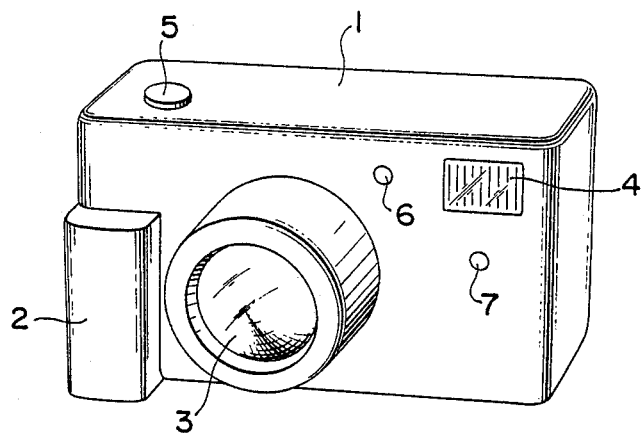
FIGS. 1 and 2 are perspective views showing a first embodiment of a wireless remote control apparatus for a camera incorporating the principles of the present invention.
Figure 2:
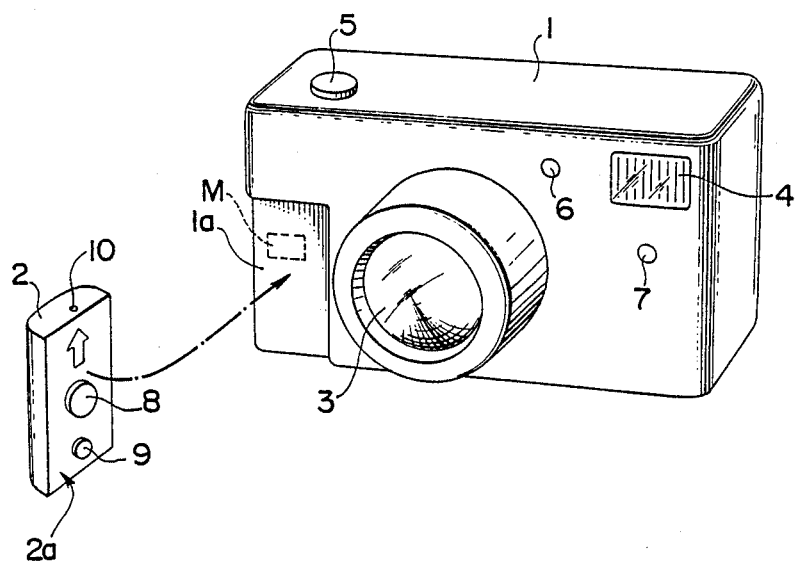

Referring now to FIGS. 1 and 2, there is shown a first embodiment of a wireless remote control apparatus for a camera of the present invention. A transmitter unit 2 of the wireless remote control apparatus is mechanically or magnetically detachably mounted on a mounting recess 1a provided on the front side of the camera body 1 at the righ end thereof. For example, a magnet M may be disposed in camera body 1 for releasably mounting transmitter unit 2. Alternatively, the magnet may be placed in the transmitter unit 2. When thee transmitter unit 2 is mounted on the camera body 1, it forms a camera grip which is readily gripped by a user and facilitates handling and use of camera 1 as shown in FIG. 1. A taking lens 3 and an electronic flash window 4 and the like are disposed on the front side of the camera body 1. A release button 5 is disposed on the upper side of the camera. A light receiving element 6 including an infrared light SPD (silicon photodiode) disposed on the front side of camera body 1 is provided for repectively receiving a confirmation mode communication signal and a photographing execution mode communiation signal including infrared light pulses emitted from the transmitter unit 2. A light indicating element 7 including a light emitting diode which lights when the element 6 receives the confirmation and photographing execution mode communication signals, it also disposed on the front side of the camera body 1, as shown.

The transmitter unit 2 is provided with a remote control release button 8 and a confirmation button 9 on the rear side 2a thereof as shown in FIG. 2, which buttons are accessible when the unit 2 is removed from its mounting location on the camera body 1. The unit 2 is furthermore provided with a transmitting element 10 including an infrared light emitting diode for emitting infrared light pulses at the upper side thereof. When the unit 2 is mounted on the camera body 1, the buttons 8 and 9 and the element 10 are concealed in the mounting recess 1a so that they are not exposed to view (refer to FIG. 1).

Figure 3:
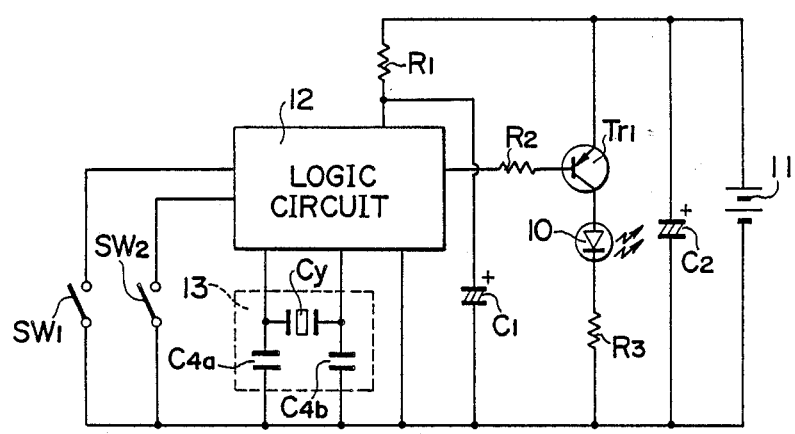
FIG. 3 is a diagram showing a transmission circuit in a transmitter unit used in the first embodiment of the wireless remote control unit.

The thus-formed transmitter unit 2 has a built-in remote control transmitter circuit which is shown in FIG. 3. The camera body 1 has a built-in remote control receiver circuit (see FIG. 5) responsive to the remote control transmitter circuit.

Figure 4A:
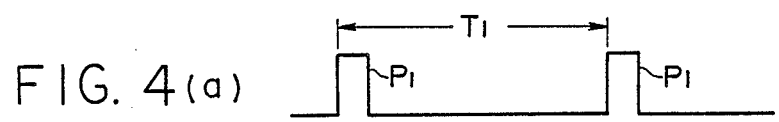
FIGS. 4(a) and (b) are waveform diagrams showing confirmation and picture taking execution communication signals respectively emitted from the transmitter unit.

The remote control transmitter circuit is principally comprised of a capacitor $C_2$, a series circuit including a switching transistor $Tr_1$, a transmitting element 10 and resistor $R_3$, a filter circuit includig a resistor $R_1$ and a capacitor $C_1$, each connected acros a battery 11, and a logic circuit 12. The filter including components $R_1$ and $C_1$ is a power source filter which protects the logic circuit 12 from a change in voltage which occurs when the transmitting element 10 emits light. A clock pulse signal is inputted to the logic circuit 12 from an oscillating circuit 13 including a quartz crystal oscillator $C_Y$, and capacitors $C_{4a}$ and $C_{4b}$. The logic circuit 12 has 2 input terminals which are respectively connected to a release switch $SW_1$ which is closed when the release button 8 is pressed and a confirmation switch $SW_2$ which is closed when the confirmation button 9 is pressed. The release switch $SW_1$ serves to input remote control photographing execution mode signal. When the switch $SW_1$ is closed, the logic circuit 12 applies a pulse signal $P_1$ having a cycle $T_1$ shown, for example, in FIG. 4(a), to the transistor $Tr_1$ through a resistor $R_2$. The confirmation switch $SW_2$ serves to input a confirmation mode signal. When the switch $SW_2$ is closed, the logic circuit 12 applies pulse signals $P_2$ having a cycle $T_2$ (see FIG. 4(b) shorter than the cycle $T_1$ (as shown in FIG. 4(a) to the transistor $Tr_1$ through the resistor $R_2$. The capacitor $C_2$ serves to accumulate a charge before emitting light sufficient to cause an electric current to stably flow to the infrared LED transmitting element 10 even when the internal reistance of the power baterry 11 is high. The logic circuit 12 may be formed o for includes CPU.

Figure 5:
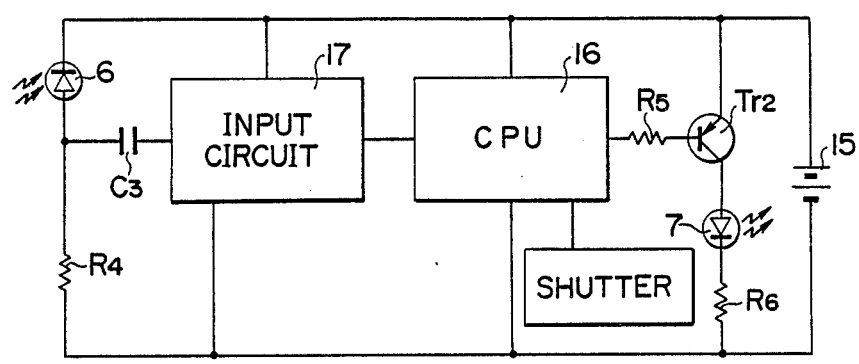
FIG. 5 is a diagram showing a receiver circuit in a camera used in the first embodiment of the the wireless remote control apparatus.
Figure 6:
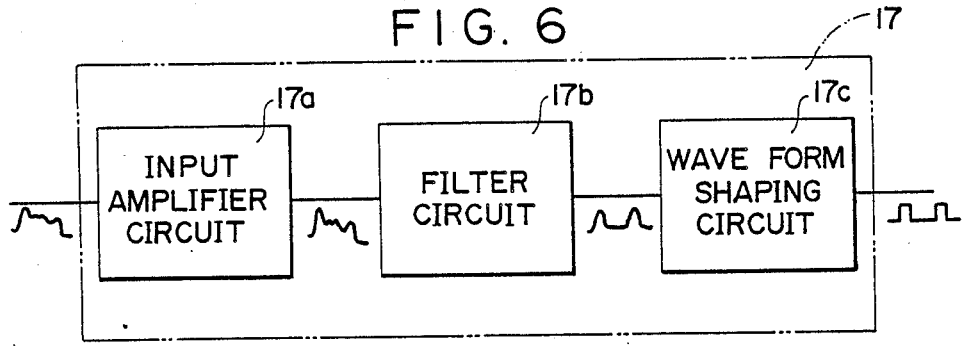
FIG. 6 is a block diagram showing an example of an input circuit shown in FIG. 5.

The remote control receiving circuit, as shown in FIG. 5, is principally comprised of a series circuit including a switching transistor $Tr_2$, the light emitting indicating element 7, a resistor $R_6$, CPU, an input circuit 17, and a series circuit of the light receiving element 6 and the resistor $R_4$, each connected across a power source battery 15. The light receiving element 6 receives the confirmation and photographing execution communication signals from the remote control transmitter unit 2 (FIG. 2, for example) and applies them to the input circuit 17 via the capacitor $C_3$. The capacitor $C_3$ serve to eliminate the d.c. component carried on the received signal, i.e. provided a.c. coupling of the received signals to the input circuit 17. The input circuit 17, as shown in FIG. 6, comprises an input amplifier circuit 17a, a filter circuit 17b, and a waveform shaping circuit 17c and serves to amplify the received signal, and process the amplified waveform to conver it into a give pulse waveform for outputting the same to CPU 16. the CPU 16, as shown in FIG. 5, receives this signal and makes a discrimination between the confirmation and photographing signals and a discrimination between these signals and noise for applying an output to the transistor $Tr_2$ throught resistor $R_5$. The CPU 16 provides an instruction to take a picture to a sequence circuit (not shown) of a camera when the received signal is a photographing execution signal.

The wireless remote control apparatus of the first embodiment is formed in such a manner.

Figure 4B:
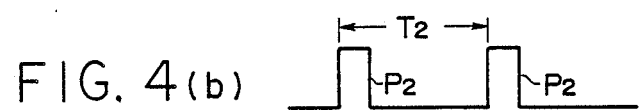
Figure 7:
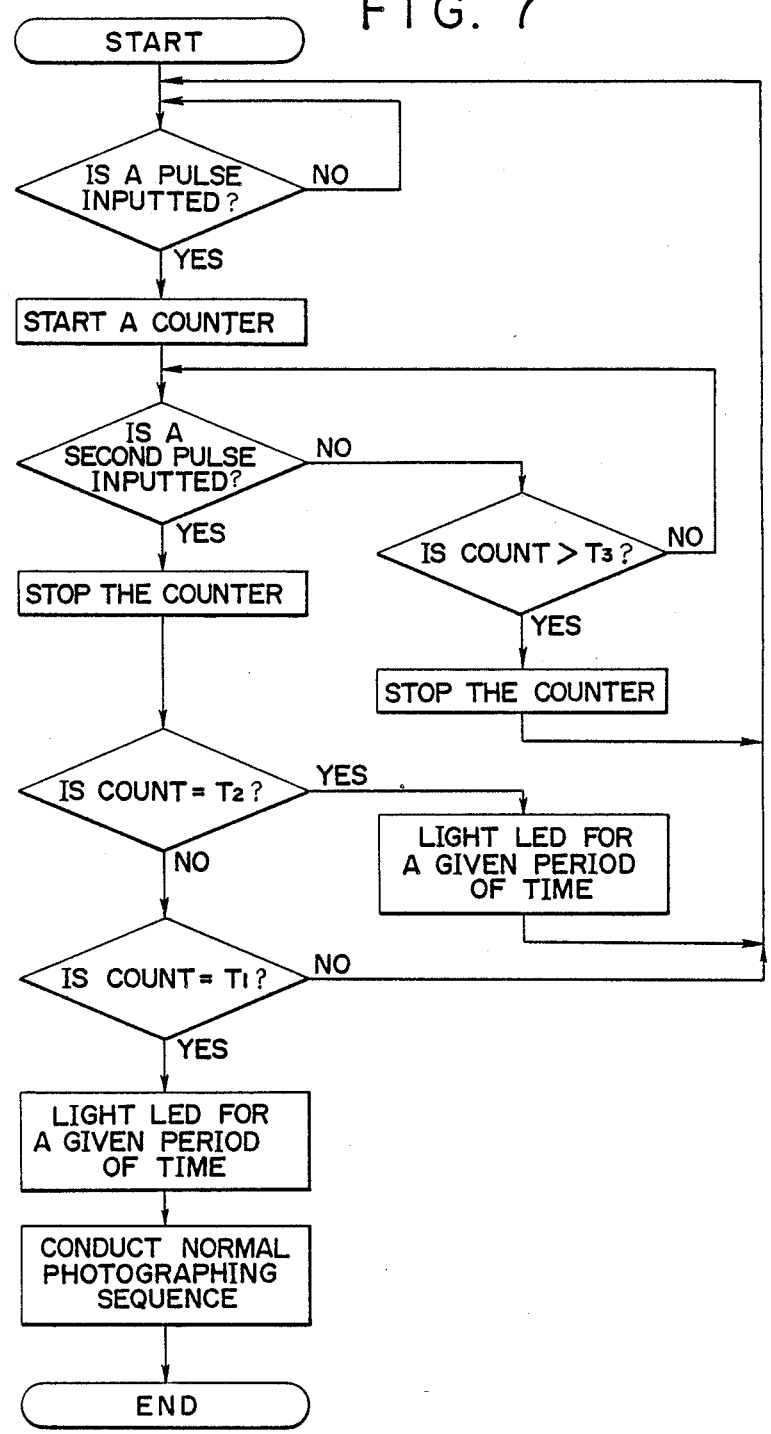
FIG. 7 is a flow chart showing the operation of the CPU shown in FIG. 5.

The operation of the wireless remote control apparatus will not be described with reference to the flow chart of the CPU 16 shown in FIG. 7. In order to take a picture by a wireless remote control or through the use a self timer, the camera body is fixedly placed in preparation for a photographing operation, using a tripod or other supporting surface, for example. the transmitter unit 2 is removed from the camera body 1 as shown in FIG. 2. The unit 2 is removed to a remote position displaced from camera body 1. Alternatively the camera body 1 may be fixedly placed for the preparation of a photographing operation after the transmitter unit 2 has been removed from the camera body 1. The transmitting element 10 is directed toward the light receiving element 6 of the camera body 1 and the confirmation button 9 is pressed. An arrow A or other aimimg indicia may be provided to facilitate aiming of the infrared beam toward the camera body 1 (see FIG. 2). The switch $SW_2$ (controlled by pushbutton 9) is then closed. A pulse signal $P_2$ having a cycle $T_2$ (refer to FIG. 4(b) is then applied to the transistor $Tr_1$ from the logic circuit 12 so that the transistor $Tr_1$ is intermittently turned on and off in a repeating fashion with the timing as shown in FIG. 4(b). The transmitting element 10 emits an infrared pulse similar to a pulse signal $P_2$ directed toward the light receiving element 6.

When the transmitter unit 2 is located in a range from the camera body 1 which assures effective reception, the light receiving element 6 which receives infrared pulses develops a reception signal, which is then subject to waveform processing (see FIG. 6) and is inputted to the CPU 16 which connections are respectively made through the capacitor $C_3$ and the input circuit 17.

The CPU 16 determines whether or not a pulse is inputted (employing, for example, a threshold level for comparison with the input being examined) and starts a counter (not shown) when an input exists by applying clock pulses from a local oscillator (not shown). The CPU 16 then determines if a second pulse is inputted (again using a threshold level, for example). The CPU 16 stops applying pulses to the counter when it detects that it has received the second pulse input and measures the time interval between the first and second pulses by counting the pulses accumulated by the counter. On the basis of the aforesaid measurement, the CPU determines that a pulse signal having a cycle $T_2$ is a confirmation mode communication siganl and a pulse signal having a cycle $T_1$ is a photographing execution mode signal and that a signal having another cycle $T_3$ is noise. If the CPU 16 determines that the signal is a confirmation mode communication signal, the CPU provides transistor $Tr_2$ with a conduction signal which lights the light emitting indication element 7 for a given period of time. Therefore a user can confirm from the lighting of the light emitting and indication element 7 of the camera body 1 that the transmitter unit 2 is located in such a position where it is capable of communicating effectively with the camera body 1.

The user then presses the release button 8 of the transmitter unit 2 to close the switch $SW_1$. Infrared pulses having a cycle $T_2$ are emitted from the transmitting element 10 and are directed so that they are incident upon the light receiving element 6 of the camera body 1. When the pulse is received, the receiver circuit (see FIGS. 5 and 6) operates in a manner similar to the operation performed when receiving the confirmation mode communication signal. The CPU 16 determines that the received signal is a photographing execution mode communication signal having a cycle $T_2$ as shown in flow chart in FIG. 7 and provides the transistor $Tr_2$ with a conduction signal to light the light emitting and indicating element 7 and further provides a sequence circuit with an instruction signal to carry out normal photographing. This is obtained as shown in simplified fashion in FIG. 5 wherein the shutter circuit is coupled to CPU 16 which initiates a photographing operation by operation of the shutter circuit, for example. Though not shown in the flow chart in FIG. 7, the light emitting and indication element 7 may be lit again to indicate that the remote control photographing was completed after completion of photographing sequence. It is convenient that three lighting manners be made different so that the user can identify which lighting is conducted, lighting for confirmation mode, lighting prior to photographing or lighting after photographing. These signals may be discriminated from one another by differences in the length of time they are lit, differences in the rates at which they are flashed on and off, and/or some combination thereof.

In accordance with the first embodiment of the wireless remote control apparatus, the user may press the release button 8 after he or she has confirmed that the transmitting unit 2 is capable of communicating with the camera body 1 as determined by pressing the confirmation button 9 and observing element 7. Accordingly, reliable remote control can be conducted without failure in remote controlling.

Figure 8:
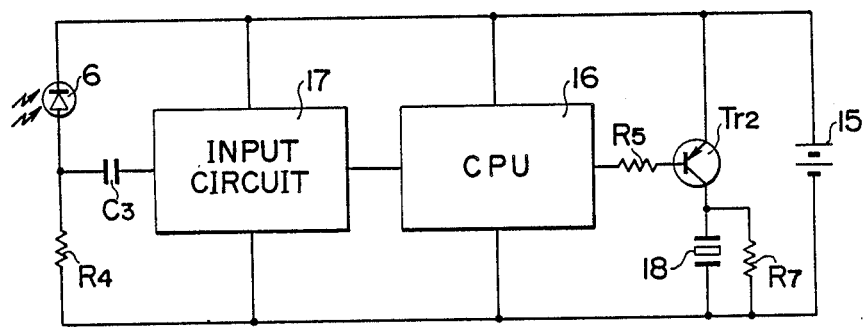
FIG. 8 is a diagram showing another example of a receiver circuit.

Referring now to FIG. 8, there is shown another receiving circuit in which a sound emitting element 18 such as well-known piezo electric ceramic vibrator (PCV) is used in lieu of the light emitting and indicating element 7 in the first embodiment of the receiver circuit (refer to FIG. 5). The operation of the circuit is similar to that of the first embodiment. When the CPU 16 identifies a pulse signal having cycle $T_1$ or $T_2$, the sound emitting element 18 is driven for a given period of time to alarm the user by an audible sound. Alternatively, element 18 may be turned on and off at a predetermined rate to indicate that it has identified the received signal.

Figure 9:
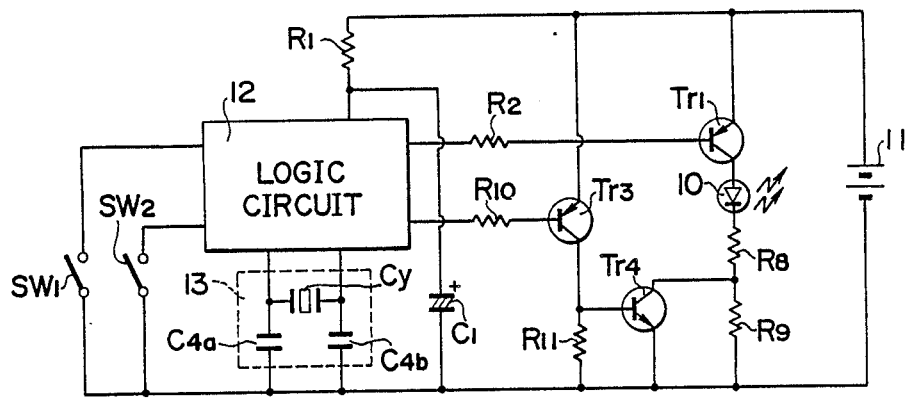
FIG. 9 is a diagram showing a transmitter circuit employed in a second embodiment of the wireless remote control apparatus.

Referring now to FIG. 9, there is shown a transmitter circuit in a second embodiment of the wireless remote control apparatus of the present invention.

The circuit is desgined in such a manner that the amplitude of the current flowing through the transmitting element 10 when the release switch $SW_1$ is pressed is different from that when the confirmation switch $SW_2$ is pressed. Release operation may be sometimes difficult even by pressing the release button 8 due to the influence of noise at a critical position in a infrared pulse reachable range although the light emitting and indicating element 7 is lit for indicating that remote control is possible on pressing the confirmation switch $SW_2$. This circuit is designed to avoid above-mentioned difficulty.

In lieu of the series circuit including the switching transistor $Tr_1$, transmitting element 10, and the resistor $R_3$, there is provided a series circuit including transistor $Tr_1$, transmitting element 10, and resistors $R_8$ and $R_9$ as well as a series circuit including a switching transistor $Tr_3$, and a resistor $R_{11}$, which series circuit is connected cross the battery 11. An output signal is applied to the transistor $Tr_3$ through the resistor $R_{10}$ from the logic circuit 12 for conducting the transistor $Tr_{13}$ when the release switch $SW_1$ is closed. Between the collector of the transistor $Tr_3$ and the common connection between the resistors $R_8$ and $R_9$ there is connected a transistor $Tr_4$ which, when turned on, short-circuits the resistor $R_9$ when the transistor $Tr_3$ is conductive.

In such a second embodiment of the transmitter circuit of FIG. 9, the transistors $Tr_3$ and $Tr_4$ are off when the transmitter element 10 emits a confirmation mode communication signal. Accordingly the current flowing through the transmitting element 10 is restricted by the resultant (i.e. total) resistance of the resistors $R_8$ and $R_9$. When the transmitter element 10 emits a photographing execution mode communication signal on closure of the release switch $SW_1$, the transistors $Tr_3$ and $Tr_4$ are conductive. Accordingly the current flowing through the transmitter element 10 is limited only by the resistance of resistor $R_8$ so that the current flowing through the element 10 is larger than that at the confirmation mode.

Therefore, the effective transmission distance of the photographing execution mode communication signal emitted on depresion of the button 8 is greater than that of the confirmation mode communication signal emitted on depression of the confirmation button 9.

In such a manner a difficulty that the release operation is not carried out by the depression of the release button 8, even if the effective transmission distance has been confirmed by the depression of the confirmation button 9, is eliminated.

Figure 10:
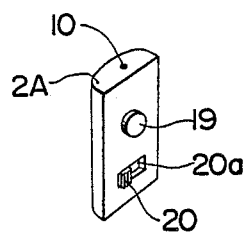
FIG. 10 is a perspective view showing another transmitter unit embodiment.
Figure 11:
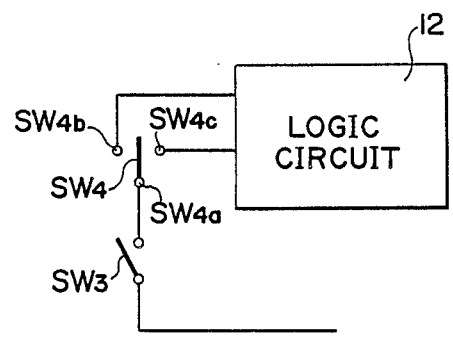
FIG. 11 is a diagram showing an input circuit of the transmitter unit of FIG. 10.

Referring now to FIGS. 10 and 11, there is shown another example of a transmitter unit of the wireless remote control apparatus. An input means for the confirmation and photographing mode signals of the transmitter unit 2A comprises a single depression switch $SW_3$ having a manually operable pushbutton 19 and a single slide change-over switch $SW_4$ having a manually operable slide knob 20. When the depression switch 19, disposed on the rear (i.e. hidden) side of the transmitter unit 2A is depressed, the switch $SW_3$ is closed. When slide knob 20 is slid in one or the other direction long the guide slot 20a, a movable contact terminal $SW_{4a}$ of the change-over switch $SW_4$ connected to the switch $SW_3$ is selectively connected to one of the fixed terminals $SW_{4b}$ and $SW_{4c}$. The fixed terminal $SW_{4b}$ is connected to a photographing execution mode signal input terminal of the logic circuit 12 and the fixed terminal $SW_{4c}$ is connected to a confirmation mode signal input terminal.

In such manner, one of the signals can be selected by selecting the position of the slide changeover switch $SW_4$. When the depression button 19 is pressed, the seleted signal is emitted.

Alternatively, a step-type depression switch (not shown) may be used as an operation means for inputting a signal into the transmitting unit, wherein operating the actuating member by pressing it down to a first depth closes a first switch and pressing the actuating member to a second depth closes a second switch. These switches may be the switches $SW_1$ and $SW_2$. If the unit is formed in such a manner that the confirmation and photographing signals are inputted into the logic circuit in the first and second steps respectively, operability can be further improved.

Although discrimination of two signals is conducted upon the basis of the time interval between two successive pulses, the discrimination is no limited to this method. For example, discrimination means using well known binary code may be used, or ultrasonic waves may be used in lieu of infrared pulses. The ultrasonic waves may be distinguished by their frequency or by their pulse rate (i.e. the repetition rate at which the ultrasonic signals are turned on and off) or by the length of time they are kept on or by some combination of these techniques (i.e. continuous and flashing) to respectively identify the confirmation mode and the execution mode.

Regarding the binary code technique, the transmitter 2 may be programmed to transmit a binary code which may, for example, be comprised of five binary bits. Assuming a five bit code, it is possible to code $2^5$, thereby providing thirty-two different instruction signals. As an example, a photographing execution mode signal may comprise the binary code 10001. This code may be transmitted in the form of infrared pulses as follows:

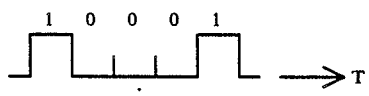

This binary code will be detected by the receiver CPU to initiate a photographing operation as well as an indication that a photographing operation is being performed by energizing element 7 shown in FIG. 5.

The transmitter may further be programmed to transmit a confirmation signal which may be comprised of binary bits 10100 shown by the following waveform:

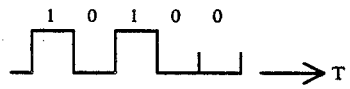

which, again may be transmitted in the form of pulses by energizing the infrared element 10 according to the confirmation mode waveform as shown. The CPU at the receiver detects this code and provides an indication that a wireless control operation can be performed.

Figure 12:
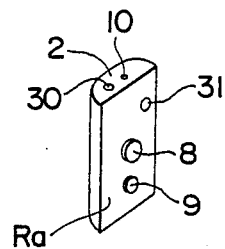
FIG. 12 is a perspective view showing another transmitter unit embodiment.
Figure 13:
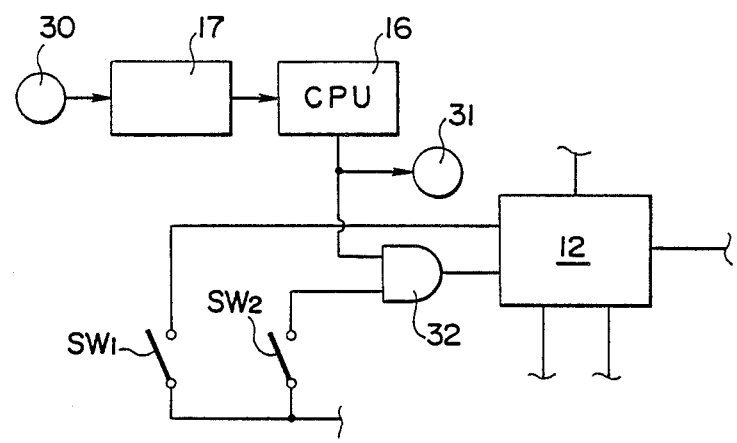
FIG. 13 is a diagram showing a modified transmitter circuit for the transmitter unit of FIG. 12.

As an additional level of capability the transmitter unit 2 shown, for example, in FIG. 2 may be modified according to the transmitter unit 2 shown in FIG. 12 wherein like elements are designated by like numerals. In addition to the capabilities of the transmitter unit 2 of FIG. 2, the transmitter unit of FIG. 12 is further provided with a display LED 31 and a detection sensor 30. In addition to these elements, the transmitter unit may be provided with a receiving circuit, for example of the same type as shown in either FIG. 5 or FIG. 8 with the modified system operating in the following manner;

The confirmation button 9 is pressed causing the transmitter unit to transmit a confirmation signal in the same manner as was previously described. The confirmation signal is analyzed by the receiver unit in the same manner as was previously described whereupon a visual indication is generated by the receiver unit. However, this visual indication may be an infrared signal of a suitable frequency which may, for example, be referred to as a "receiver acknowledge" signal. This signal may resemble the signals shown in FIG. 4(a) and (b) and may be of a time interval different from the time intervals $T_1$ and $T_2$, for example. Analysis of the "receiver acknowledge" signal may be performed in the same manner as was previously described by an input circuit and CPU provided at the transmitter unit or by any other suitable circuit having a similar capability. The signal received by the transmitter unit, which is a valid "receiver acknowledge" signal, is received by detection sensor 30 provided in transmitter unit 2. The transmitter unit may be modified in the manner shown in FIG. 13 wherein only a portion of the circuitry shown in FIG. 3 has been reproduced for purposes of simplicity. Sensor unit 30 is coupled to CPU 16 through input circuit 17. Circuit 17 may be of the type shown in FIG. 6, for example.

Upon determination that the analyzed signal is a "receiver acknowledge" signal, CPU 16 enables gate 32 and illuminates lamp 31. Thus, when switch $SW_2$ is closed, this closed condition is applied to logic circuit 12 through gate 32. Lamp 31 indicates to the user that a release operation may now be performed.

In the event that a "receiver acknowledge" signal is not present, CPU 16 fails to enable gate 32 thereby preventing a release operation even in the event that switch $SW_2$ is closed.

In order to permit the user to delay performance of the release operation, a latch or bistable flip-flop arranged between CPU 16 and gate 32 (not shown for purposes of simiplicity) may be set by CPU 16 for purposes of energizing lamp 31 and enabling gate 32 for an indefinite time to permit the operator to initiate a release operation at a time chosen by the user.

As mentioned above, the present invention provides the following advantages;

(1) Since it can be confirmed whether or not the camera is located in an effective transmission area by emitting a confirmation mode communication signal prior to transmitting a photographing execution signal for remotely controlling a camera, positive remote control is assured and the film, flash and battery energy will not be wasted.

(2) Operation and its enabling conditions can be confirmed by an indicating means from a remote position far from a camera.

(3) As shutter chance is not lost since the shutter can be released at a desired time.

(4) The stored power of the battery in the transmitter unit can be checked upon basis of the effective transmission distance if the transmission distance is known when the wireless remote control apparatus is normally operated.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

For example, the remote control equipment may be employed to operate other types of equipment and is not limited to operating a camera. The remote control unit may be employed to remotely operate any device where it is desired to initially establish that the control of the device to be exercised will be effective before performing the remote control operation.

What is claimed is:

1. A wireless remote control apparatus for a camera comprising;
   a receiver unit associated with said camera and an independent transmitter unit;
   said transmitter unit including;
   means for generating a confirmation mode signal;
   means for generating a photographing execution mode signal;
   switching means for selectively operating one of said confirmation mode and execution mode signal generating means;
   means for transmitting the signal being generated;
   said receiver unit including;
   means for detecting said transmitted signal;
   means for determining whether the signal detected by the detecting means is the confirmation mode signal or the photographing execution mode signal to respectively generate a confirmation mode reply or a photographing execute signal;
   means responsive to a reply signal for generating an indication that the camera may be remotely controlled by the wireless remote control apparatus; and
   means responsive to a photographing execute signal for initiating a photographing operation.

2. A wireless remote control apparatus for a camera as defined in claim 1 wherein said camera includes a camera body and said transmitter unit is detachably mounted upon said camera body.

3. A wireless remote control apparatus for a camera as defined in claim 1 wherein said camera includes a camera body and said camera body includes means for detachably mounting said transmitter unit.

4. A wireless remote control apparatus for a camera as defined in claim 1 wherein said camera includes a camera body and said receiver unit is located in said camera body.

5. A wireless remote control apparatus for a camera as defined in claim 3 wherein said means for detachably mounting includes magnetic means.

6. A wireless remote control apparatus for a camera as defined in claim 1 in which said means for generating a confirmation mode signal further comprises means for generating pulses generated at predetermined spaced intervals, and
   said photographing execution mode signal generating means comprises means for generating pulses at predetermined spaced intervals different from the spaced intervals between the pulses of said confirmation mode signal.

7. A wireless remote control apparatus for a camera as defined in claim 1 or 2 further comprising means for controlling the transmission output of said photographing execution mode signal so that it has a greater amplitude than said confirmation mode signal.

8. A wireless remote control apparatus as defined in claim 1 in which said indication generating means generates a visual indication responsive to said photographing execution mode signal.

9. A wireless remote control apparatus as defined in claim 1 in which said indication generating means generates an audible indication responsive to said photographing execution mode signal.

10. A transmitter for remotely controlling a camera comprising means for generating a confirmation mode signal to selectively confirm that remote control of said camera is possible;
    means for generating a photographing execution mode signal to initiate a photographing operation by the camera;
    switching means to selectively operate one of said signal generating means; and
    means for transmitting signals responsive to the operative one of said signal generating means.

11. A transmitter for remotely controlling a camera as defined in claim 10 in which said transmitting means comprises a light emitting element for generating infrared pulses.

12. A receiver for use in the remote control of a camera comprising;
    means for detecting a control signal transmitted to said camera which control signal is one of a confirmation mode signal and a photographing execution mode signal;
    means for determining whether the signal detected by the detecting means is the confirmation mode signal or the photographing execution mode signal;
    means responsive to the confirmation mode signal for providing an indication that the camera may be remotely controlled by a remote control apparatus; and
    means responsive to the photographing execution mode signal for initiating a photographing operation.

13. A receiver for remotely controlling a camera as defined in claim 12 in which said indication providing means is also operative responsive to said photographing execution mode signal.

14. A receiver for remotely controlling a camera as defined in claim 12 in which said indication means comprises an element which generates one of a visual and an audible indication.

15. A wireless remote control apparatus for a camera comprising;
    a transmitter for selectively generating a signal for executing a photographing operation and a confirmation signal for performing only an indication of reception of the confirmation signal without initiating a photographing operation; and
    a receiver including means for initiating a photographing operation responsive to said photographing signal and means for operating an indication means responsive to said confirmation signal.

16. A transmitter for remotely controlling a camera comprising;
    a power source;
    actuating means;
    an oscillation circuit which selectively generates a photographing execution signal for initiating a photographing operation and a confirmation signal which activates only an indication operation without initiating a photographing operation in response to actuation of said actuating means; and
    a light emitting element for generating infrared light pulses responsive to the output from said oscillation circuit.

17. A transmitter for remotely controlling a camera as defined in claim 16 in which said actuating means comprises an oscillation circuit actuation member and a change-over member having at least first and second positions, said oscillation circuit generating one of a photographing execution signal and a confirmation signal responsive to the position of the change-over member and the operation of said oscillation actuation member.

18. A remotely controlled photographic camera comprising;
a power source;
a receiving means which receives at least first and second signals generated from a location external to and remote from said camera and includes means to discriminate said first and second signals from one another to respectively provide first and second outputs;
indicating means being operative responsive to at least said first output; and
photographing operation executing means which operates responsive to said second output.

19. A wireless remote control apparatus for operating a device from a remote location, said remote control apparatus comprising;
a receiver unit associated with said device and an independent transmitter unit;
said transmitter unit including;
means for generating a confirmation mode signal,
means for generating a device execution signal;
switching means for selectively operating one of said confirmation mode and execution mode signal generating means; and
means for transmitting the signal being generated;
said receiver unit including;
means for detecting said transmitted signal;
means for determining whether the signal detected by the detecting means is a confirmation mode signal or a device execution mode signal to respectively generate a confirmation mode reply or a device execute signal;
means responsive to a reply signal for generating an indication that said device may be remotely controlled by the wireless remote control apparatus; and
means responsive to a device execution signal for initiating operation of said device.

20. A wireless remote control apparatus for operating a device as defined in claim 19 wherein said device includes;
a device housing, said transmitter unit being detachably mounted upon said housing.

21. A wireless remote control apparatus for operating a device as defined in claim 19 wherein said device includes a housing, said housing including means for detachably mounting said transmitter unit.

22. A wireless remote control apparatus for operating a device as defined in claim 21 wherein said means for detachably mounting includes magnetic means.

23. A method for operating a device from a remote location through the employment of a wireless remote control apparatus comprising a transmitter unit and a receiver unit;
said transmitter unit including signal transmitting means and said receiver unit including signal receiving and signal transmitting means, said method comprising the steps of;
generating a signal of a first type for operating said transmitting unit transmitting means;
determining the type of signal received by said receiver unit receiving means;
operating said receiver unit transmitting means when the signal being examined is of said first type;
generating a signal of a second type responsive to the presence of an indication by said receiver unit transmitting means;
applying said second type of signal to said transmitter unit transmitting means;
determining if the signal received by said receiver unit receiving means is a signal of said second type; and
initiating operation of said device when the signal is of said second type.

24. The method of claim 23 wherein said device is a camera and the step of initiating operation of said device comprises the step of initiating a photographing operation.

25. The method of claim 24 wherein the step of generating said first type of signal further comprises the step of generating pulses at predetermined time intervals.

26. The method of claim 25 wherein the step of generating a second type of signal further comprises the step of generating pulses at predetermined time intervals wherein the time intervals between pulses of said second type of signal are different from the time intervals between the pulses of said first type of signal.

27. The method of claim 26 wherein said transmitter unit transmitting means comprises light generating means and the steps of producing first and second types of signals each comprise the step of generating pulses for operating said light generating means in a pulsed manner.

28. The method of claim 27 wherein said light generating means comprises means for generating light in the infrared range and said receiver unit receiving means comprises means for detecting light in the infrared range, and wherein the step of detecting the first type of signal further comprises the step of analyzing the pulse signals generated by said receiving unit receiving means.

29. The method of claim 28 wherein the step of analyzing said first type of signals further comprises the steps of;
initiating a timing means responsive to receipt of a pulse;
terminating said timing means upon receipt of the next pulse; and
determining the type of signal received based on the elapsed time accumulated by said timing means.

30. The method of claim 28 wherein the step of analyzing said pulses further comprises the steps of;
generating clock pulses at a predetermined rate;
accumulating said clock pulses responsive to receipt of a pulse from said receiving unit receiving means;
determining the number of clock pulses counted upon receipt of the next pulse from said receiving unit receiving means; and
determining the type of signal received based upon the number of accumulated clock pulses.

31. The method of claim 23 wherein the steps of generating first and second type signals each further comprises the steps of;
providing switching means having a first state for initiating a confirmation mode and a second state for initiating a device execution mode;

operating said switching means to said first state to develop a confirmation signal;

operating said switching means to said second state to develop an execution signal;

generating pulses of a first type when the switching means is in said first state and generating signals of a second type when said switching means is in said second state.

32. The method of claim 23 further comprising the step of;

increasing the amplitude of the output of said transmitter unit transmitting means when said switching means is in said second state.

33. The method of claim 31 further comprising the step of;

increasing the amplitude of the output of said transmitter unit transmitting means when said switching means is in said second state.

34. The method of claim 23 further comprising the step of;

energizing said receiving unit indication means responsive to detection of said second type of signal.

35. The method of claim 34 further comprising the step of;

energizing said receiving unit indication means responsive to completion of the operation of the device initiated by said device execution signal.

36. The method of claim 23 further comprising the steps of;

activating said indication means responsive to detection of said second type of signal and thereafter initiating operation of said device.

37. The method of claim 36 wherein the step of operating the indication means responsive to the presence of a second type of signal further comprises the step of;

operating said receiver unit indication means in a manner different from operating said receiver unit indication means responsive to the presence of a first type of signal.

38. The method of claim 37 wherein the step of operating said indication means further comprises flashing the indication means at a first rate in the presence of said first type of signal and at a second rate in the presence of said second type of signal.

39. The method of claim 37 wherein the step of operating said receiver unit indication means is further comprised of the step of energizing the indication means for a first predetermined time interval in the presence of said first type of signal and at a different time interval in the presence of said second type of signal.

40. The method of claim 37 wherein said indication means is operated to flash in the presence of one of said first and second types of signals and is operated to be constantly illuminated for a predetermined time interval in the presence of the remaining one of said first and second types of signals.

41. The method of claim 23 wherein the step of generating a first type signal further comprises the step of;

energizing the transmitting unit transmitting means according to a predetermined binary code comprised of a plurality of binary bits wherein one bit state of said binary bits energizes said transmitting means and the other bit state of said binary bits deenergizes said transmitter unit transmitting means.

42. The method of claim 41 wherein said binary code comprises five binary bits arranged in a predetermined format.

43. The method of claim 41 wherein the step of generating a second type signal further comprises the step of;

energizing the transmitting unit transmitting means according to a predetermined binary code comprised of a plurality of binary bits wherein one bit state of said binary bits energizes said transmitting means and the other bit state of said binary bits deenergizes said transmitter unit transmitting means; and wherein said binary code representing said second type signal is different from the binary code representing said first type signal.

44. The method of claim 41 wherein the second type binary code for the second type signal is comprised of five binary bits arranged in a combination different from the binary code combination representing said first type signal.

45. A wireless remote control apparatus for a camera as defined in claim 1 wherein said transmitter unit further includes means normally disabling said means for generating a photographing execution mode signal and enabling said means for generating a photographing execution mode signal responsive to said means for generating at indication provided in said receiving unit.

46. A wireless remote control apparatus for a camera as defined in claim 45 wherein said means for normally disabling said means for generating a photographing execution mode signal comprises sensor means for sensing an output from said means for generating an indication; and means responsive to said last-mentioned sensor means for enabling said normally disabled means for generating an execution mode signal.

47. A wireless remote control apparatus for a device as defined in claim 19 wherein said transmitter unit further includes means normally disabling said means for generating an execution mode signal and enabling said means for generating an execution mode signal responsive to said means for generating an indication provided in said receiver unit.

48. A wireless remote control apparatus for a device as defined in claim 47 wherein said means for normally disabling said means for generating an execution mode signal comprises sensor means for sensing an output from said means for generating an indication; and means responsive to said last-mentioned sensor means for enabling said normally disabled means for generating an execution mode signal.

49. A wireless remote control apparatus for operating a camera according to claim 1 wherein said transmitter unit further comprises;

means for indicating that wireless remote control operation is possible responsive to said confirmation acknowledge signal.

50. A transmitter as defined in claim 16 further comprising;

sensing means for sensing an indication from said device acknowledging receipt of said confirmation signal;

means normally disabling said oscillation circuit and responsive to said sensing means for enabling said oscillation circuit responsive to a confirmation acknowledge indication signal for enabling said oscillation circuit to generate a photographing execution signal responsive to a actuation of said actuating means.

51. A transmitter according to claim 50 wherein said sensing means includes means adapted to sense an infrared light pulse.

* * * * *

UNITED STATES PATENT AND TRADEMARK OFFICE
CERTIFICATE OF CORRECTION

PATENT NO. : 4,937,604

DATED : June 26, 1990

INVENTOR(S) : Yoshida et al.

It is certified that error appears in the above-identified patent and that said Letters Patent is hereby corrected as shown below:

Column 1, line 46, "determin" should be --determine--

Column 1, line 47, "appartus" should be --apparatus--

Column 1, line 55, "washed" should be --wasted--

Column 2, line 59, "righ" should be --right--

Column 2, line 62, "thee" should be --the--

Column 3, line 10, "it" should be --is--

Column 3, line 32, "includig" should be --including--

Column 3, line 33, "acros" should be --across--

Column 3, line 58, "reistance" should be --resistance-- and "baterry" should be --battery--

Column 3, line 59, "o for" should be --of or--

Column 3, line 60, after "includes" insert --a--

Column 3, line 64, after "CPU" insert --16--

Column 4, line 10, "conver" should be --convert--

Column 4, line 11, "give" should be --given--

Column 4, line 23, "not" should be --now--

UNITED STATES PATENT AND TRADEMARK OFFICE
CERTIFICATE OF CORRECTION

PATENT NO. : 4,937,604

DATED : June 26, 1990

INVENTOR(S) : Yoshida et al.

It is certified that error appears in the above-identified patent and that said Letters Patent is hereby corrected as shown below:

Column 4, line 28, "the" should be --The--

Column 4, line 38, "aimimg" should be --aiming--

Column 4, line 68, "siganl" should be --signal--

Column 5, line 66, "desgined" should be --designed--

Column 6, line 15, "cross" should be --across--

Column 6, line 17, "$Tr_{13}$" should be --$Tr_3$--

Column 6, line 56, "long" should be --along--

Column 8, line 55, "As" should be --A--

Signed and Sealed this

Fifteenth Day of October, 1991

*Attest:*

HARRY F. MANBECK, JR.

*Attesting Officer*  *Commissioner of Patents and Trademarks*